US007180903B1

(12) United States Patent
Haartsen

(10) Patent No.: US 7,180,903 B1
(45) Date of Patent: Feb. 20, 2007

(54) RESOURCE MANAGEMENT IN UNCOORDINATED FREQUENCY HOPPING SYSTEM

(75) Inventor: Jacobus Cornelis Haartsen, Hardenberg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1003 days.

(21) Appl. No.: 09/666,298

(22) Filed: Sep. 21, 2000

Related U.S. Application Data

(63) Continuation-in-part of application No. 09/385,024, filed on Aug. 30, 1999.

(60) Provisional application No. 60/226,675, filed on Aug. 22, 2000, provisional application No. 60/217,102, filed on Jul. 10, 2000, provisional application No. 60/133,404, filed on May 10, 1999.

(51) Int. Cl.
*H04B 7/212* (2006.01)
(52) U.S. Cl. ...................... 370/442; 370/436
(58) Field of Classification Search ............... 370/344, 370/347, 441, 442, 458, 480; 375/132, 133, 375/135, 136
See application file for complete search history.

(56) References Cited

U.S. PATENT DOCUMENTS

| | | | | |
|---|---|---|---|---|
| 5,448,569 A | * | 9/1995 | Huang et al. ............... 370/332 |
| 5,570,352 A | * | 10/1996 | Poyhonen ................... 370/330 |
| 5,774,808 A | * | 6/1998 | Sarkioja et al. ............. 455/436 |
| 5,809,401 A | * | 9/1998 | Meidan et al. ............. 455/63.3 |
| 6,061,389 A | * | 5/2000 | Ishifuji et al. .............. 375/133 |
| 6,088,591 A | * | 7/2000 | Trompower et al. ........ 455/438 |
| 6,108,366 A | | 8/2000 | Haartsen |
| 6,381,053 B1 | * | 4/2002 | Fathallah et al. ............. 398/99 |
| 6,434,183 B1 | * | 8/2002 | Kockmann et al. ......... 375/132 |
| 6,519,245 B1 | * | 2/2003 | Bird ........................... 370/347 |

OTHER PUBLICATIONS

Jaap Haartsen, "Bluetooth—The Universal Radio Interface for Ad Hoc, Wireless Connectivity", Ericsson Review, Telecommunications Technology Journal, No. 3, 1998, pp. 110-117.

* cited by examiner

*Primary Examiner*—Huy D. Vu
*Assistant Examiner*—Toan Nguyen
(74) *Attorney, Agent, or Firm*—Potomac Patent Group PLLC

(57) ABSTRACT

A method and apparatus for communication using a plurality of time slots within a frequency spectrum is described. A fast frequency hopping traffic channel having a set of the plurality of time slots and a first set of hop carrier frequencies is established between a first and a second communication unit. A slow frequency hopping traffic channel having a second set of hop carrier frequencies is established between a third and fourth communication unit.

24 Claims, 4 Drawing Sheets

RESOURCE MANAGEMENT IN UNCOORDINATED FREQUENCY HOPPING SYSTEM

CROSS-REFERENCE TO RELATED APPLICATIONS

The present application is a Continuation-In-Part of co-pending U.S. application Ser. No. 09/385,024 filed Aug. 30, 1999 entitled "RESOURCE MANAGEMENT IN UNCOORDINATED FREQUENCY HOPPING SYSTEM" by J. C. Haartsen which claims priority from U.S. Provisional Application No. 60/133,404 filed May 10, 1999 and which is incorporated herein by reference. The present application further claims priority from two U.S. Provisional Applications both entitled "RESOURCE MANAGEMENT IN UNCOORDINATED FREQUENCY HOPPING SYSTEM" by J. C. Haartsen, 60/217,102 filed Jul. 10, 2000 and 60/226,675 Aug. 22, 2000 respectively, and both of which are incorporated herein by reference

BACKGROUND

The present invention relates to radio communication systems. In particular, the present invention is related to communication systems which use frequency hopping in un-licensed frequency carriers.

In the last decades, progress in radio and VLSI technology has fostered widespread use of radio communications in consumer applications, portable devices, such as mobile radios, can now be produced having acceptable cost, size and power consumption.

In the system described in U.S. patent application Ser. No. 09/385,024, supra (hereinafter "the parent application"), a hybrid or combined communication channel is used which includes a Frequency Hopping (FH) channel for medium-range, low-rate services and a static or fixed frequency channel for short-range, high-rate services. The system may be considered generally based on the Bluetooth air interface which defines a FH channel using a basic rate of 1 Mb/s in the 2.4 GHz ISM band. For more information on Bluetooth, see, for example, "Bluetooth, the Universal Radio Interface for Ad Hoc wireless connectivity", J. C. Haartsen, Ericsson Review, Telecommunications Technology Journal, No. 3, 1998. In a Bluetooth piconet, for example as described in the parent application, a high rate static channel may be defined by selecting a broadband channel, e.g. 4 MHZ, which may be positioned at a spectral location which may be determined to have the least amount of interference. The static channel may be determined by adaptive channel allocation based on receive signal strength measurements carried out by the radio units. Once a static channel of about 4 MHZ bandwidth has been selected in the manner described, high data rate communication, for example, between multiple slave may proceed directly over the fixed channel.

Communication over the FH channel is configured to avoid the frequency band occupied by the static channel in order to avoid mutual interference. The parent application describes how the FH sequence used on the FH channel may be adapted to avoid the frequency band occupied by the static high-rate channel. It should be noted that since a typical Bluetooth-based system uses 79 channels, and since only 75 are generally required, the FH sequence can be adapted to avoid 4 carriers of 1 MHZ each. The combined bandwidth of the avoided channels represents 4 MHZ, thus fitting the requirement for the high-rate channel.

It should further be noted that the FCC rules require systems to spread signal energy when operating in the 2.4 GHz ISM band at power levels higher than 0.75 mW but lower than 1 W. Frequency hopping systems are further required to hop over at least 75 carriers, with the hop channel bandwidth restricted to 1 MHZ. Aside from signal energy spreading from frequency hopping, signal energy spreading may also be obtained using direct-sequence spread spectrum (DSSS), provided the spreading gain is at least 10. For systems having higher user rates, DSSS may be less appropriate since the requirement for broader bandwidth increases the probability that a DSSS system may interfere with or be interfered by another system operating in the ISM band.

On the high-rate 4 MHZ fixed channel a multilevel modulation is proposed as described in the parent application, with the relatively narrowband fixed channel providing about 10 Mb/s of user rate. The narrowband fixed channel allows much of the ISM band to be rejected by filtering; and thus the overlap probability is reduced. However, since the DSSS rules which specify, inter alia, 10 dB processing gain, and the FHSS rules which specify, inter alia, no hop channel bandwidth larger than 1 MHZ, are unfulfilled by the multilevel modulation scheme, data transfer on the high-rate fixed channel operates under the low-power rules, e.g. transmit power of 0.75 mW or lower, thus limiting the range associated with the fixed channel.

Accordingly, requests have been made by several manufacturers of FH systems operating in the ISM band to relax the requirements on the FH channel. In particular, the bandwidth restriction of 1 MHZ restricts the data rate in FH systems to 1–2 Mb/s.

It would therefore be appreciated that a need exists in the art for a method and apparatus for providing an increase in frequency hopping bandwidth and an increase in transmit power in accordance with revised ISM requirements.

SUMMARY

Accordingly, a method for communication using a plurality of time slots within a frequency spectrum is described. In accordance with one aspect of the present invention, solutions to the foregoing and other problems are achieved by establishing a fast frequency hopping traffic channel between a first and a second communication unit. The fast frequency hopping traffic channel may have a set of the plurality of time slots, e.g. as may be associated with a TDMA communication environment, and a first set of hop carrier frequencies within the frequency spectrum associated therewith. A slow frequency hopping traffic channel may then be established between a third and fourth communication unit. It should be noted that the slow frequency hopping traffic channel may have a second set of hop carrier frequencies within the frequency spectrum associated therewith.

In accordance with various exemplary embodiments of the present invention, one or more data packets may be communicated on one or more of the set of the plurality of time slots from the first communication unit to the second communication unit over the fast frequency hopping traffic channel at a rate of between 1–3 Mb/s. It should be noted that in accordance with, for example, ISM standards, the bandwidth associated with a fast frequency hopping channel may preferably be 1 MHZ. Data packets may further be communicated from the third communication unit to the fourth communication unit on one or more of the set of the plurality of time slots over the slow frequency hopping traffic channel at a rate exceeding 5 Mb/s. It should further be noted that in accordance with the present invention, the bandwidth associated with the slow frequency hopping channel may be on the order of 4 MHz.

In further accordance with various exemplary embodiments of the present invention, the slow frequency hopping traffic channel may be established by establishing an initial location of the slow frequency hopping traffic channel according to a slow hop sequence. The initial location may be, for example, a first 4 MHz band located within the frequency spectrum. Thereafter, it may be determined that a time interval, e.g. 100 ms, associated with the slow hop sequence has expired. Responsive to the expiration of the time interval, the location of the slow frequency hopping traffic channel may be adapted according to the slow hop sequence and located at a new 4 MHZ band elsewhere in the frequency spectrum. It will be appreciated that one or more data packets may be communicated on one or more of the first set of the plurality of time slots from the first communication unit to the second communication unit over the fast frequency hopping traffic channel such that the initial location and the adapted location are avoided. Accordingly, the number of hop carrier frequencies associated with the fast frequency hopping traffic channel is reduced. for example, by the size of the slow frequency hopping traffic channel.

In accordance with various additional exemplary embodiments of the present invention, the fast frequency hopping traffic channel may be established between the first, the second, and the third communication unit and the slow frequency hopping traffic channel may be established between the second and the third communication unit. During communication therebetween, the fast frequency hopping traffic channel avoids the location of the slow frequency hopping traffic channel. It should further be noted that the first communication unit may be a master communication unit, the second communication unit may a FFH slave unit, and the third communication unit may be a SFH slave unit. While a single FFH and SFH unit are mentioned hereinabove, it should be noted that one or more of each type of slave unit may be used without departing from the invention.

In accordance with still further exemplary embodiments of the present invention, a beacon packet may be periodically transmitted from the master to the FFH and SFH slave units over the fast frequency hopping traffic channel. The beacon packet may indicate to the FFH and SFH slave units the location of the slow frequency hopping traffic channel by including such information therein.

BRIEF DESCRIPTION OF THE DRAWINGS

The objects and advantages of the invention will be understood by reading the following detailed description in conjunction with the drawings in which.

DETAILED DESCRIPTION

Figure 1:
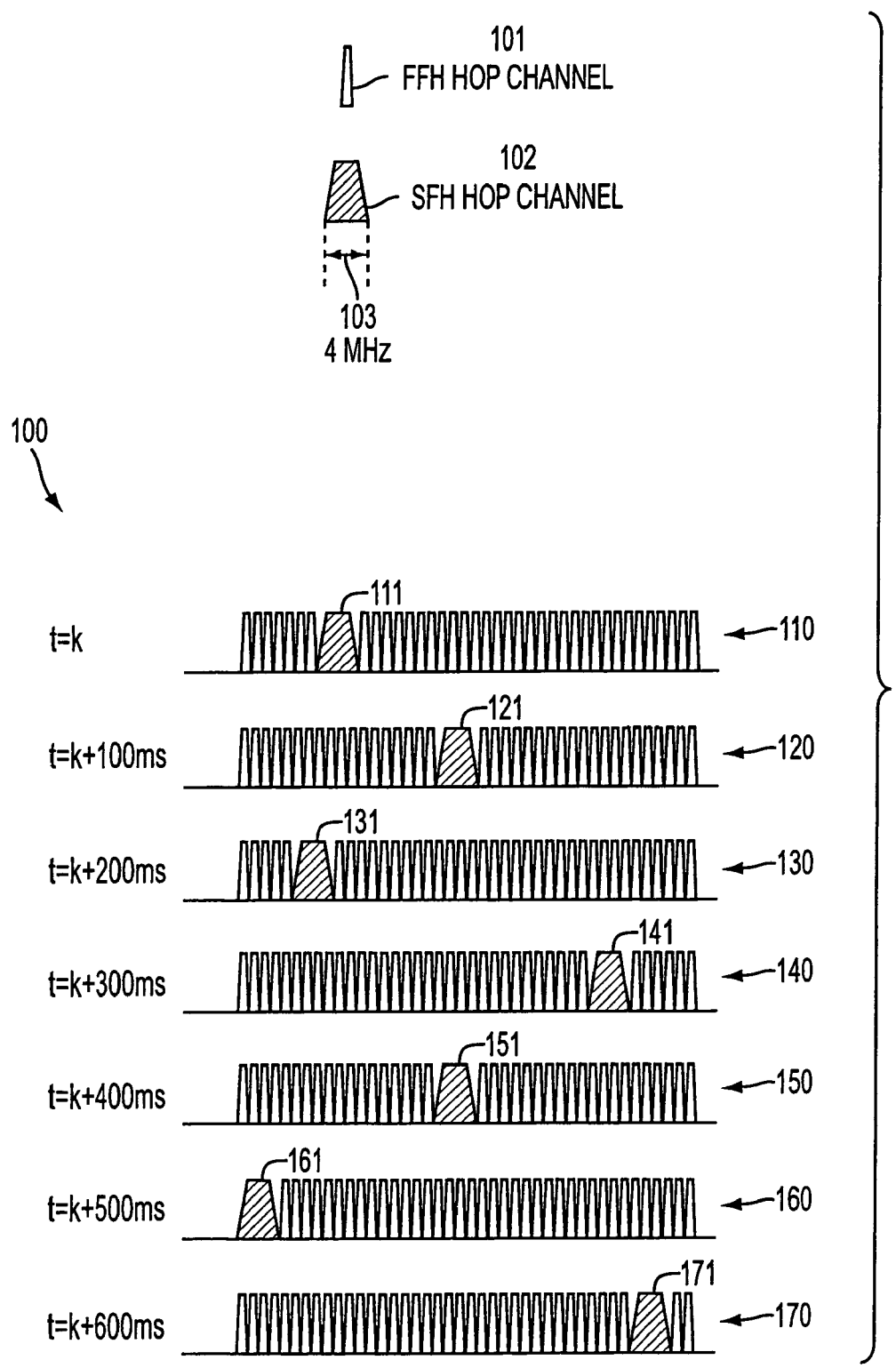
FIG. 1 is a diagram illustrating exemplary fast and slow frequency hopping in accordance with various exemplary embodiments of the present invention.

The various features of the invention will now be described with respect to the figures, in which like parts are identified with the same reference characters.

Thus in accordance with the present invention dual FH using a narrow band, fast FH channel for low-speed communications, and a wide band, slow FH channel for high-speed (HS) communications is described. The fast FH channel dynamically avoids the frequency range momentarily occupied by the slow FH channel. Since the sequences and phases of both the fast FH (FFH) channel and the slow FH (SFH) channel are known, the FFH radios adapt their sequence continuously in order to avoid the SFH channel.

As compared generally with the parent application, the static channel described in the parent application may be replaced by a slow FH channel. The dynamic sequence adaptation has been described in "Method and apparatus for sequence adaptation," by J. C. Haartsen, U.S. patent application Ser. No. 09/418,562, filed Oct. 15, 1999. It should further be noted that master slave concepts as described generally in the parent application are incorporated herein and are thus not described or illustrated.

In FIG. 1 series 100 of spectrum diagrams are illustrated. Spectral usage of FFH channels 101 and SFH channels 102 at different moments in time are shown. It should be noted that in accordance with various exemplary embodiment of the present invention, FFH channel 101 hops at a rate of 1600 hops/s and SFH channel 102 hops at a much slower rate such as, for example, 10 hops/s. Accordingly, during a first 100 ms interval, as may be represented by spectral interval 110, SFH channel 102 may be "semi" stationary relative to, for example, the much faster hopping FFH channel 101. It should further be noted that 4 MHZ channel 103 occupied by SFH channel 102 located, for example, at position 111, may be avoided in a manner similar as described in the parent application while taking into account the slow hopping of SFH channel 102 as will be described in greater detail hereinafter. In the next 100 ms, as represented by interval 120, SFH channel 102 may occupy position 121 in another part of the band. An FFH system transmitting on FFH channels 101, may now adapt its avoidance window to prevent mutual interference once between FFH channels 101 and SFH channel 102. It should be noted that the carriers used by FFH channel 101 and SFH channel 102 are shown in FIG. 1 in steps corresponding to, for example, the dwell time of SFH channel 102, e.g. 100 ms.

Figure 2A:
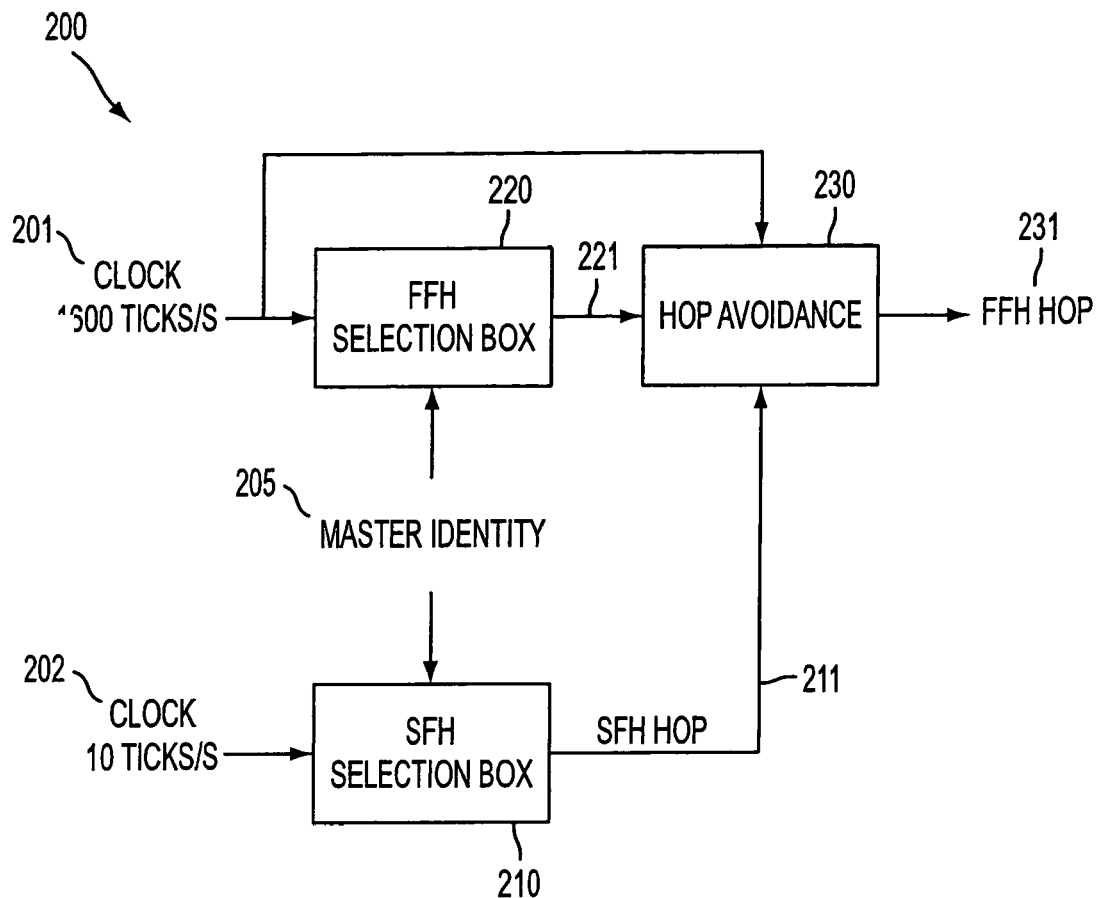
FIG. 2A is a block diagram illustrating exemplary frequency hopping selection and avoidance control in accordance with various exemplary embodiments of the present invention.

Before SFH channel 102 is established, units participating on FFH channel 101 may be informed of the establishment of SFH channel 102 and may be given an address to select SFH sequence and timing information. Accordingly, as shown in FIG. 2A, FFH selection block 220 may use master identity 205 and master clock 201 at 1600 ticks/s, to select a hop sequence for FFH channel 101. In addition, master identity 205 and SFH clock 202 which may initialized when SFH channel 102 is established and which may tick at 10 ticks/s, may be used by SFH selection block 210 to select a hop sequence for SFH channel 102. An implementation for the hop selection box bas been described in "Method and apparatus for the generation of frequency hopping sequences," by J. C. Haartsen, U.S. patent application Ser. No. 08/950,068, filed Oct. 24, 1997. Selection in both SFH selection block 210 and FFH selection block 220 therefore may be implemented in a similar way with, for example, different timing constraints.

Figure 2B:
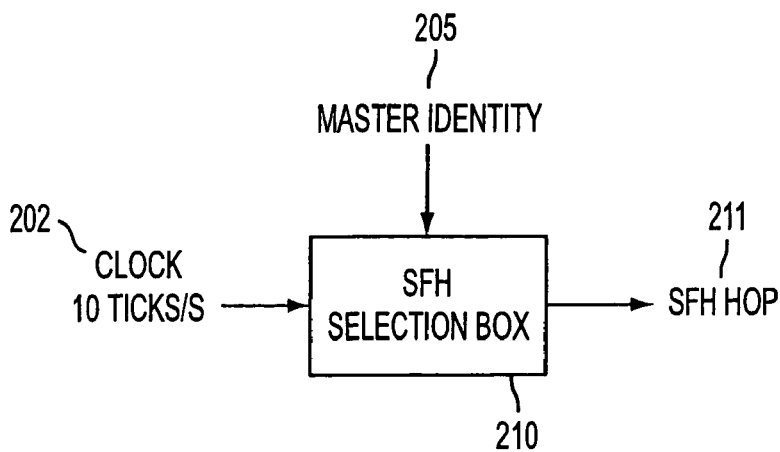
FIG. 2B is a block diagram further illustrating exemplary frequency hopping selection and avoidance control in accordance with various exemplary embodiments of the present invention.

The output of SFH selection block 210 may be SFH hop sequence 211 and may be fed to, for example, hop avoidance block 230 which using output from FFH selection block 220, e.g. intermediate FFH hop sequence 221, creates a window in a FFH spectrum range. More particularly, if FFH hop sequence 221 includes hop carrier which is within the frequency band indicated by SFH hop sequence 211, a different FFH carrier may be selected as been described by U.S. Ser. No. 09/418,562, supra. Accordingly, a modified FFH hop sequence 231 may be generated as an output. It should be noted that master clock 201 may also be fed to hop avoidance block 230 in order to randomize the replacement of "forbidden" carriers by "allowed carriers". It should further be noted that every 100 ms, SFH hop sequence 211 changes and a different set of carriers becomes forbidden for FFH hop sequence 221. In addition, master clock 201 and SFH clock 202 are preferably derived from the same reference clock. For an SFH-only communication units, only SFH selection block 210 is used as is shown in FIG. 2B.

Figure 3:
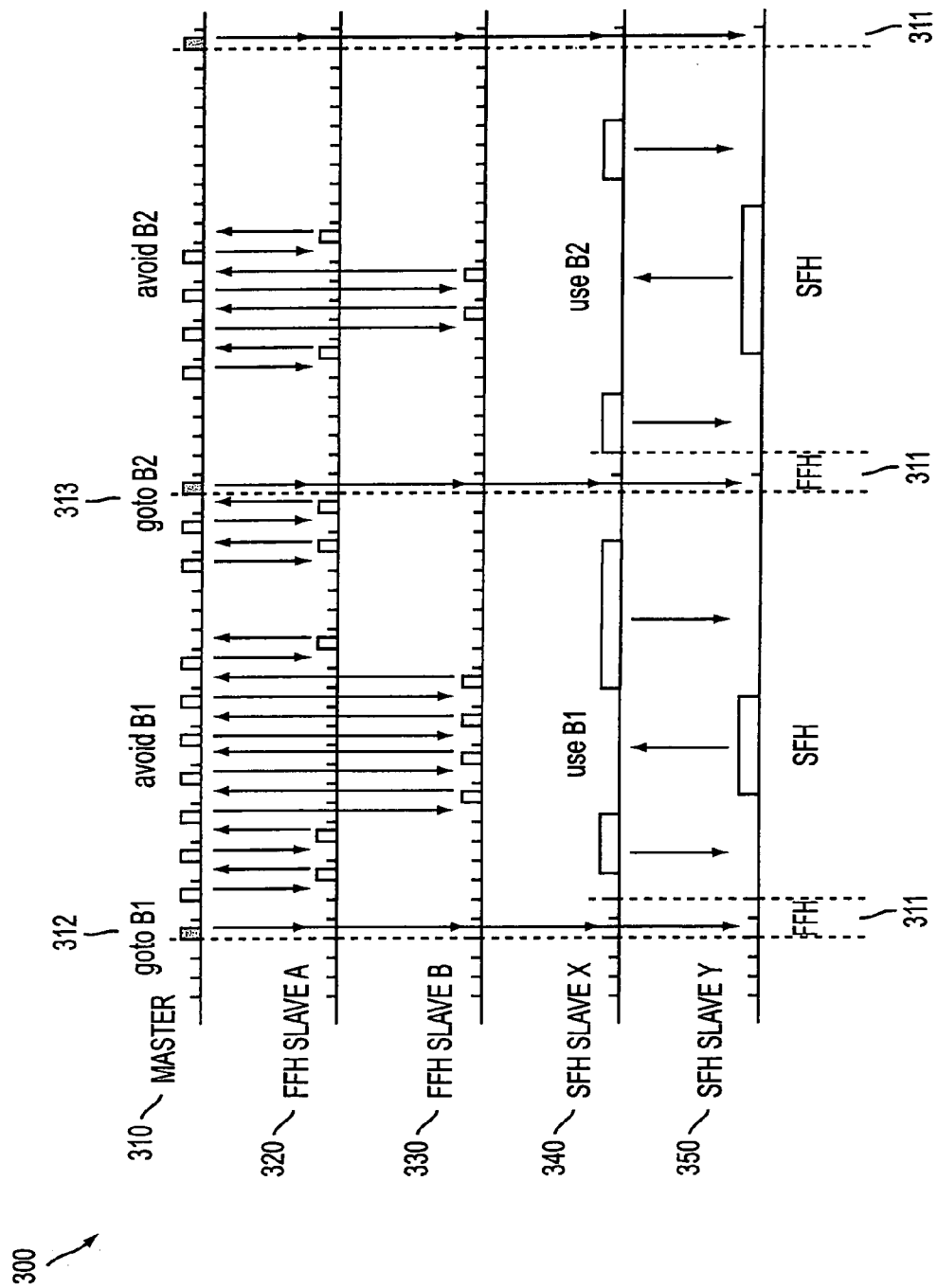
FIG. 3 is a diagram illustrating exemplary communication sequences between and among a master and slow and fast frequency hopping slaves in accordance with various exemplary embodiments of the present invention.

In yet another exemplary embodiment in accordance with the present invention, communicating units do not use a SFH selection box. Instead, as illustrated in FIG. 3, master unit 310 for each new SFH channel tells, for example, SFH slave units, SFH slave X 340 and SFH slave Y 350 where to hop and tells FFH units such as, for example, FFH slave A 320 and FFH slave B 330 which hops to avoid. Control of slave units in the foregoing manner may be accomplished by exploiting, for example, the beacon channel specified in Bluetooth and further described in the parent application. As was further described in the parent application, there is a strong interaction between, for example, a FFH piconet and a stationary channel. Communicating units on the stationary channel may remain connected to the FH piconet via the beacon channel established using beacon signals sent on the FH channel by the master. More particularly, communication units transferring data on the stationary high-speed channel periodically return to the FH piconet to listen to the beacon channel. In accordance with exemplary embodiment of the present invention, beacon channel 311 may be established and a packet may be sent thereupon which contains a frequency band to be used next by, for example, SFH slave X 340 and SFH slave Y 350. Since information on beacon channel 311 is broadcast to all units in range, FFH slave A 320 and FFH slave 330, for example, may use information associated with beacon channel 311 to open a window in the FFH sequence.

As is further illustrated in FIG. 3, information associated with beacon channel 311 may be transmitted at a periodic interval, for example every 100 ms, by master 310. Accordingly, FFH slave A 320, FFH slave B 330, SFH slave X 340 and SFH slave Y 350 may listen to beacon channel 311 to adjust their channel parameters. Further as illustrated in FIG. 3, first beacon packet 312 sent by master 310 on beacon channel 311 may direct, for example, SFH slave X 340 and SFH slave Y 350 to band B1. FFH slave A 320 and FFH slave B 330 accordingly may receive first beacon packet 312 and use the information contained therein to avoid carriers associated with band B1. Second beacon packet 313 may be sent by master 310 on beacon channel 311 to direct SFH slave X 340 and SFH slave Y to band B2 and to inform FFH slave A 320 and FFH slave B 330 to avoid carriers in band B2, and so on. It should be noted that the SFH sequence may be generated within master 310 and may depend upon, for example, the identity of master 310 and/or a random or pseudo-random number. It should be noted that in an alternative exemplary embodiment, such as, for example, a multi-piconet environment, beacon 311 is preferably transmitted by an anchor unit as has been described in an unpublished paper entitled "Method for networking in uncoordinated FH piconets," by J. C. Haartsen, Ericsson Disclosure Reference No. BT12778. An anchor unit may be used to coordinate and control a number of independent piconets. Individual piconets may further adjust respective FFH avoidance windows based on beacon information sent by the anchor unit.

Figure 4:
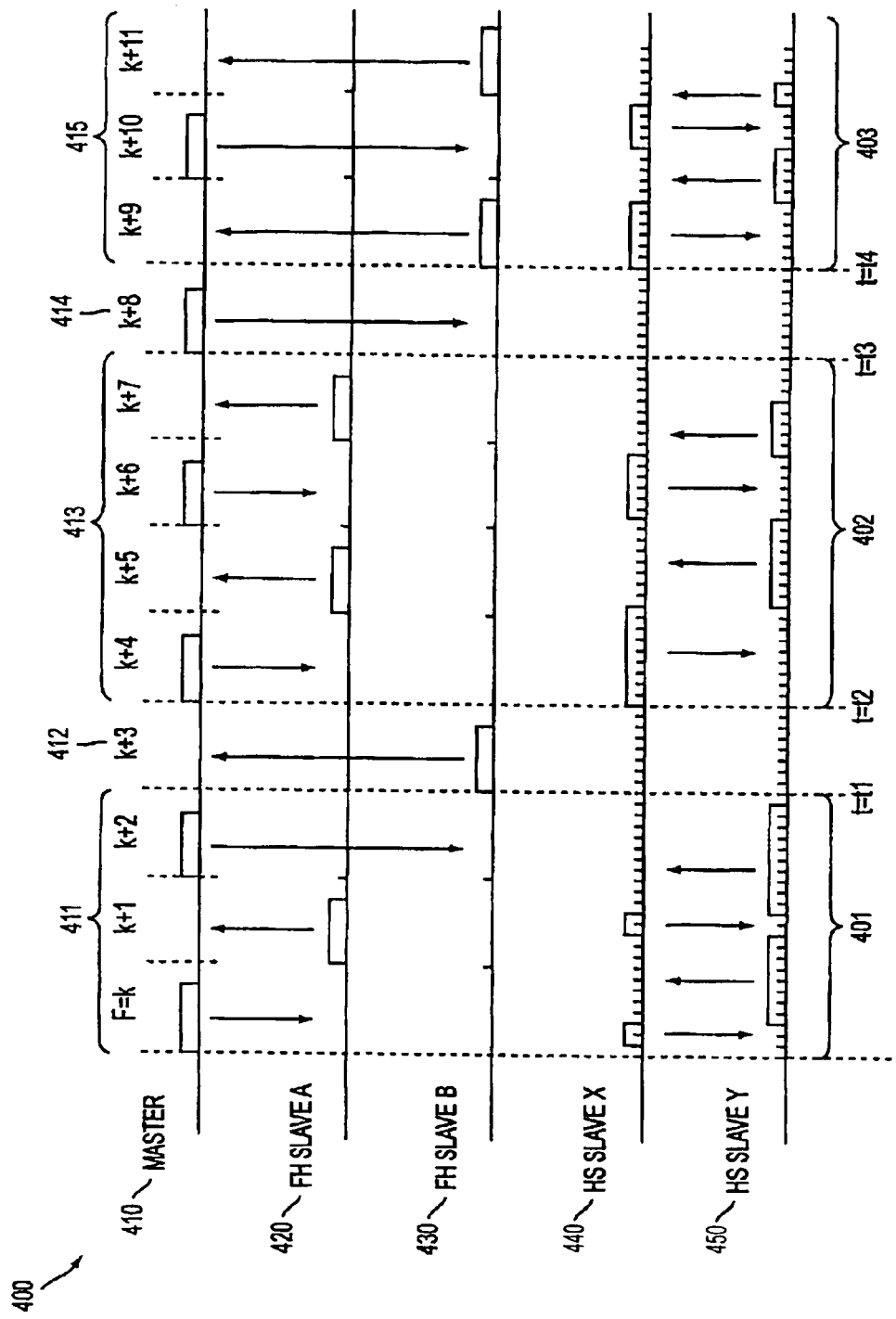
FIG. 4 is a diagram illustrating exemplary communication sequences between a master and frequency hopping slaves and between a master and slaves on a static communication channel in accordance with various exemplary embodiments of the present invention.

Further in accordance with alternative exemplary embodiments as illustrated in FIG. 4, communication scenario 400 may include master 410, FH slave A 420, FH slave B 430, HS slave X 440, and HS slave Y 450. It should be noted that HS slave X 440 and HS slave Y 450 communicate on a static high speed traffic channel as may further be described in the parent application. Accordingly, a FH channel may be established between, for example, master 410 and FH slave A 420, and between master 410 and FH slave B 430 during timeslots within exemplary intervals 411, 413, and 415. HS slave X 440 and HS slave Y 450, may communicate on an HS channel during exemplary intervals 401, 402, and 403. It should be noted that the FH channel may use timeslots with a dwell time of, for example, 625 μsec and different carrier frequencies such as, for example, F=k, k+1, . . . , k+11 as illustrated, according to a pseudo-random hop pattern. The HS channel may use a single carrier frequency chose using, for example, a dynamic channel allocation scheme or the like, and may use much smaller or shorter timeslots to better accommodate communication on the HS channel between HS slave X 440 and HS slave Y 450. It should further be noted that while FH channels and the static HS channel may use separate frequencies, timeslots may be aligned.

As is further described in the parent application, HS slave X 440 and HS slave Y 450 are fully aware of timing and hop sequences associated with communications on the FH channel and are configured to operate within the FH band. Accordingly, HS slave X 440 and HS slave Y 450 may, for example, suspend communications when the FH hop sequence overlaps with the HS frequency channel as illustrated, for example, in exemplary intervals 412 and 414. As can be seen during the duration of an overlap, for example, between t1 and t2 for interval 412 and between t3 and t4 for interval 414, HS slave X 440 and HS slave Y 450 may suspend transmission on the HS channel. More specifically, it can be seen that exemplary hop carrier F=k+3 at interval 412 and hop carrier F=k+8 overlap with the frequency of the HS channel. Thus, any packets scheduled for transmission, for example, by HS slave X 440 or HS slave Y 450 must be completed before t1 or t3. Otherwise, transmission must be postponed until after t2 or t4.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for communication using a plurality of time slots within a frequency spectrum, the method comprising the steps of:
   establishing a fast frequency hopping traffic channel between a first and a second communication unit, the fast frequency hopping traffic channel having a set of the plurality of time slots and a first set of hop carrier frequencies within the frequency spectrum; and
   establishing a slow frequency hopping traffic channel between a third and a fourth communication unit, the slow frequency hopping traffic channel having a second set of hop carrier frequencies within the frequency spectrum, wherein the step of establishing the slow frequency hopping traffic channel further comprises the step of establishing an initial location of the slow frequency hopping traffic channel according to a slow hop sequence, wherein the step of establishing the slow frequency hopping traffic channel further includes the steps of:
   determining that a time interval associated with the slow hop sequence has expired; and
   adapting a location of the slow frequency hopping traffic channel according to the slow hop sequence responsive to the expiration of the time interval.

2. The method of claim 1, further comprising the step of communicating one or more first data packets on one or more of the set of the plurality of time slots from the first communication unit to the second communication unit over the fast frequency hopping traffic channel at a rate of between 1–3 Mb/s.

3. The method of claim 1, further comprising the step of communicating one or more first data packets on one or more of the set of the plurality of time slots from the third communication unit to the fourth communication unit over the slow frequency hopping traffic channel at a rate exceeding 5 Mb/s.

4. The method of claim 1, further comprising the step of communicating one or more first data packets on one or more of the first set of the plurality of time slots from the first communication unit to the second communication unit over the fast frequency hopping traffic channel such that the initial location and the adapted location are avoided by the fast frequency hopping traffic channel.

5. A method for communication using a Plurality of time slots within a frequency spectrum, the method comprising the steps of:
   establishing a fast frequency hopping traffic channel between a first and a second communication unit, the fast frequency hopping traffic channel having a set of the plurality of time slots and a first set of hop carrier frequencies within the frequency spectrum; and
   establishing a slow frequency hopping traffic channel between a third and a fourth communication unit, the slow frequency hopping traffic channel having a second set of hop carrier frequencies within the frequency spectrum, wherein the step of establishing the slow frequency hopping traffic channel further comprises the step of establishing an initial location of the slow frequency hopping traffic channel according to a slow hop sequence, wherein the step of establishing the location further includes reducing a number of hop carrier frequencies associated with the fast frequency hopping traffic channel.

6. A method for communication using a plurality of time slots within a frequency spectrum, the method comprising the steps of:
   establishing a fast frequency hopping traffic channel between a first and a second communication unit, the fast frequency hopping traffic channel having a set of the plurality of time slots and a first set of hop carrier frequencies within the frequency spectrum; and
   establishing a slow frequency hopping traffic channel between a third and a fourth communication unit, the slow frequency hopping traffic channel having a second set of hop carrier frequencies within the frequency spectrum further comprising the steps of:
   establishing the fast frequency hopping traffic channel between the first, the second, and the third communication unit; and
   wherein the fast frequency hopping traffic channel avoids a location of the slow frequency hopping traffic channel and wherein a beacon packet is transmitted to the third communication unit, the beacon packet containing frequency hopping related information.

7. The method of claim 6, wherein the first communication unit is a master communication unit, the second communication unit is a FFH slave unit, and the third communication unit is a SFH slave unit, and wherein the method further comprises the step of periodically transmitting the beacon packet from the master to the FFH and SFH slave units over the fast frequency hopping traffic channel, the beacon packet indicating to the FFH and SFH slave units the location of the slow frequency hopping traffic channel.

8. An apparatus for communication using a plurality of time slots within a frequency spectrum, the apparatus comprising:
   a first, second, third, and fourth communication unit coupled together over an air interface;
   wherein the first communication unit is configured to:
   establish a fast frequency hopping traffic channel between a first and a second communication unit, the fast frequency hopping traffic channel having a set of the plurality of time slots and a first set of hop carrier frequencies within the frequency spectrum; and
   establish a slow frequency hopping traffic channel between the third and the fourth communication unit, the slow frequency hopping traffic channel having a second set of hop carrier frequencies within the frequency spectrum, wherein the first communication unit, in establishing the slow frequency hopping traffic channel, is further configured to establish an initial location of the slow frequency hopping traffic channel according to a slow hop sequence, wherein the first communication unit, in establishing the slow frequency hopping traffic channel, is further configured to:
   determine that a time interval associated with the slow hop sequence has expired; and
   adapt a location of the slow frequency hopping traffic channel according to the slow hop sequence responsive to the expiration of the time interval.

9. The apparatus of claim 8, wherein the first communication unit is further configured to communicate one or more first data packets on one or more of the first set of the plurality of time slots from the first communication unit to the second communication unit over the fast frequency hopping traffic channel at a rate of between 1–3 Mb/s.

10. The apparatus of claim 8, wherein the first communication unit is further configured to communicate one or more first data packets on one or more of the first set of the plurality of time slots from the third communication unit to the fourth communication unit over the slow frequency hopping traffic channel at a rate exceeding 5 Mb/s.

11. The apparatus of claim 8, wherein the first communication unit is further configured to communicate one or more first data packets on one or more of the set of the plurality of time slots from the first communication unit to the second communication unit over the fast frequency hopping traffic channel such that the initial location and the adapted location of the slow frequency hopping traffic channel is avoided by the fast frequency hopping traffic channel.

12. An apparatus for communication using a Plurality of time slots within a frequency spectrum, the apparatus comprising:
a first, second, third, and fourth communication unit coupled together over an air interface;
wherein the first communication unit is configured to:
establish a fast frequency hopping traffic channel between a first and a second communication unit, the fast frequency hopping traffic channel having a set of the Plurality of time slots and a first set of hop carrier frequencies within the frequency spectrum; and
establish a slow frequency hopping traffic channel between the third and the fourth communication unit, the slow frequency hopping traffic channel having a second set of hop carrier frequencies within the frequency spectrum, wherein the first communication unit, in establishing the slow frequency hopping traffic channel, is further configured to establish an initial location of the slow frequency hopping traffic channel according to a slow hop sequence, wherein the first communication unit is further configured to reduce the number of time slots associated with the set of the plurality of time slots.

13. An apparatus for communication using a plurality of time slots within a frequency spectrum, the apparatus comprising:
a first, second, third, and fourth communication unit coupled together over an air interface;
wherein the first communication unit is configured to:
establish a fast frequency hopping traffic channel between a first and a second communication unit, the fast frequency hopping traffic channel having a set of the plurality of time slots and a first set of hop carrier frequencies within the frequency spectrum; and
establish a slow frequency hopping traffic channel between the third and the fourth communication unit, the slow frequency hopping traffic channel having a second set of hop carrier frequencies within the frequency spectrum, wherein the first communication unit is further configured to:
establish the fast frequency hopping traffic channel between the first, the second, and the third communication unit; and
wherein the fast frequency hopping traffic channel avoids a location of the slow frequency hopping traffic channel and wherein a beacon packet is transmitted to the third communication unit, the beacon packet containing frequency hopping related information.

14. The apparatus of claim 13, wherein the first communication unit is a master communication unit and the second communication unit is a FFH slave unit, and the third communication unit is a SFH slave unit, and wherein the first communication unit is further configured to periodically transmit a beacon packet from the master to the FFH and SFH slave units over the fast frequency hopping traffic channel, the beacon packet indicating to the FFH and SFH slave units the location of the slow frequency hopping traffic channel.

15. A method for communication using a plurality of time slots within a frequency spectrum, the method comprising the steps of:
establishing a fast frequency hopping traffic channel between a first and a second communication unit, the fast frequency hopping traffic channel having a set of the plurality of time slots and a first set of hop carrier frequencies within the frequency spectrum; and
establishing a static traffic channel between a third and a fourth communication unit, the static traffic channel having a carrier frequency within the frequency spectrum;
wherein the step of establishing the static traffic channel further comprises the step of establishing an initial location of the static traffic channel according to dynamic channel allocation; and further includes the steps of:
determining that a frequency overlap exists between the static traffic channel and one or more of frequencies associated with the frequency hopping traffic channel; and
suspending communication on the static traffic channel during the frequency overlap;
wherein said first, second, third and fourth communication units are each different communication units.

16. The method of claim 15, further comprising the step of communicating one or more first data packets on one or more of the set of the plurality of time slots from the first communication unit to the second communication unit over the fast frequency hopping traffic channel at a rate of between 1–3 Mb/s.

17. The method of claim 15, further comprising the step of communicating one or more first data packets from the third communication unit to the fourth communication unit over the static traffic channel at a rate exceeding 5 Mb/s.

18. The method of claim 15, further comprising the steps of: establishing the frequency hopping traffic channel between the first, the second, and the third communication unit; and
wherein a beacon packet is transmitted to the third communication unit, the beacon packet associated with the frequency hopping traffic channel.

19. The method of claim 18, wherein the first communication unit is a master communication unit, the second communication unit is a FH slave unit, and the third communication unit is a HS slave unit, and wherein the method further comprises the step of periodically transmitting the beacon packet from the master to the FH and HS slave units over the frequency hopping traffic channel, the beacon packet indicating to the FH and HS slave units the location of the frequency hopping traffic channel.

20. An apparatus for communication using a plurality of time slots within a frequency spectrum, the apparatus comprising:
an air interface; and
a first, second, third, and fourth communication unit coupled together over the air interface, the first communication unit is configured to:
establish a frequency hopping traffic channel between the first and the second communication unit, the frequency hopping traffic channel having a set of the plurality of time slots and a first set of hop carrier frequencies within the frequency spectrum, and establish a static traffic channel between the third and the fourth communication unit, the static traffic channel having a carrier frequency within the frequency spectrum;

wherein said first, second, third and fourth communication units are each different communication units;

wherein the first communication unit, in establishing the static traffic channel, is further configured to establish an initial location of the static traffic channel according to dynamic channel allocation;

determine that a frequency overlap exists between the static traffic channel and one or more of frequencies associated with the frequency hopping traffic channel; and suspend communication on the static traffic channel during the frequency overlap.

21. The apparatus of claim 20, wherein the first communication unit is further configured to communicate one or more first data packets on one or more of the first set of the plurality of time slots from the first communication unit to the second communication unit over the frequency hopping traffic channel at a rate of between 1–3 Mb/s.

22. The apparatus of claim 20, wherein the third communication unit is further configured to communicate one or more first data packets from the third communication unit to the fourth communication unit over the static traffic channel at a rate exceeding 5 Mb/s.

23. The apparatus of claim 20, wherein the first communication unit is further configured to:

establish the frequency hopping traffic channel between the first, the second, and the third communication unit; and wherein a beacon packet is transmitted to the third communication unit, the beacon packet associated with the frequency hopping traffic channel.

24. The apparatus of claim 23, wherein the first communication unit is a master communication unit and the second communication unit is a FH slave unit, and the third communication unit is a HS slave unit, and wherein the first communication unit is further configured to periodically transmit the beacon packet from the master to the FH and HS slave units over the frequency hopping traffic channel, the beacon packet indicating to the FH and HS slave units the location of the frequency hopping traffic channel.

* * * * *